United States Patent [19]

King

[11] Patent Number: 4,919,209

[45] Date of Patent: Apr. 24, 1990

[54] METHOD FOR TREATING SUBTERRANEAN FORMATIONS

[75] Inventor: Milton T. King, Tulsa, Okla.

[73] Assignee: Dowell Schlumberger Incorporated, Tulsa, Okla.

[21] Appl. No.: 297,812

[22] Filed: Jan. 17, 1989

[51] Int. Cl.⁵ .............................................. E21B 43/26
[52] U.S. Cl. .................................... 166/300; 166/308; 252/8.551
[58] Field of Search ............... 166/270, 271, 280, 281, 166/300, 308; 252/8.551

[56] References Cited

U.S. PATENT DOCUMENTS

| | | | |
|---|---|---|---|
| 3,990,978 | 11/1976 | Hill | 166/308 X |
| 4,506,734 | 3/1985 | Nolte | 166/308 |
| 4,560,486 | 12/1985 | Hinkel | 166/308 X |
| 4,741,401 | 5/1988 | Walles et al. | 166/300 |
| 4,795,574 | 1/1989 | Syrinek et al. | 252/8.551 |

Primary Examiner—George A. Suchfield
Attorney, Agent, or Firm—Stephen A. Littlefield

[57] ABSTRACT

A method for breaking the fracturing fluid comprises injecting into the subterranean formation a controlled release breaker capsule including an enclosure material enveloping a breaker. The enclosure material is sufficiently permeable to at least one fluid existing in the subterranean environment or injected with the controlled release capsule such that the breaker capsule is capable of dissolving or eroding upon sufficient exposure to the fluid, thereby releasing the breaker.

Using the method of the present invention, breaking of fracturing fluids is significantly improved when the temperature in the subterranean environment is from about 20° C. to about 65° C.

14 Claims, 1 Drawing Sheet

VISCOSITY PROFILE AT 130°F. NOTE THE IMMEDIATE VISCOSITY DECREASE THAT OCCURS WHEN USING NON-ENCAPSULATED BREAKERS.

VISCOSITY PROFILE AT 130°F. NOTE THE IMMEDIATE VISCOSITY DECREASE THAT OCCURS WHEN USING NON-ENCAPSULATED BREAKERS.

METHOD FOR TREATING SUBTERRANEAN FORMATIONS

FIELD OF THE INVENTION

The present invention relates to fracturing fluids and to a method for delivering a material into a subterranean formation and, more particularly, to a method for breaking a fracturing fluid using a controlled release breaker capsule to deliver a breaker to a fracturing fluid in the subterranean formation, and to fracturing fluids containing such a controlled release breaker capsule.

TECHNOLOGY REVIEW

In the drilling of a well and the subsequent recovery of fluids such as crude oil and natural gas from subterranean formations, various materials are added to the well bore and/or subterranean formation to improve the efficiency of the well drilling operation, to increase production of the fluids from the formation and/or to terminate and seal a non-producing well. These treating agents are generally added, in their active form, above ground and flow into the well bore or through the well bore to the subterranean formation.

For example, a subterranean formation is often subjected to a fracturing treatment to stimulate the recovery of fluids such as crude oil or natural gas. In fracturing the formation, a fluid is introduced into the well at a rate and pressure sufficient to produce one or more fractures in the formation and/or enlarge or extend exiting fractures. The fluid can contain a propping agent such as sand or sintered bauxite which is deposited in the fractures to maintain the fractures and/or an acid which reacts with the acid-soluble components of the formation thereby creating and enlarging passageways for the flow of fluids from the formation.

Heretofore, in both hydraulic fracturing and fracture acidizing operations, a high viscosity, gelled aqueous fluid, gelled hydrocarbon based fuids, a high viscosity water/hydrocarbon emulsion or a foam of a gas/water dispersion has typically been employed. These high viscosity fluids are capable of the necessary penetration to realize maximum benefits from the fracturing operation and in suspending the propping agents, if employed, without excessive settling. In addition, the high viscosity fluids are capable of opening the fractures to a greater width than is possible with the low viscosity fluid.

After the high viscosity aqueous solution or emulsion has been pumped into a subterranean formation and the fractures formed, it is generally desirable to convert the gel or emulsion into a low viscosity fluid, thereby allowing the fluid to be removed from the formation and the desired material such as oil or natural gas, to flow back through the fractures into the wellbore. This reduction of the viscosity of the fracturing fluid is commonly referred to as "breaking" the gel or emulsion. Conventionally, this breaking of the gel or emulsion is carried out by adding a viscosity reducing agent (commonly called a "breaker") to the formation at the desired time. Unfortunately, the conventional techniques often result in insufficient breaking (i.e., an insufficient reduction in the viscosity of the fracturing fluid) or premature breaking of the fluid. Premature breaking of the fluid causes a reduction in the viscosity of the fracturing fluid prior to the desired termination of the fracturing operation, thereby reducing the overall effectiveness of the operation. As a conventional example of premature breaking, calcium hydroxide has been mixed with silica flour and used as a breaker. Below 125° F. excessive amounts of breaker were required for a complete break, which occurred immediately.

A delayed release breaker for an aqueous fracturing fluid is described in U.S. Pat. No. 4,741,401. This patent describes a controlled release breaker capsule which is slowly ruptured as the capsule is exposed to aqueous fluid in the subterranean formation thereby releasing a breaker to the formation.

However, a deficiency of prior gelled oil fracturing fluid systems employing breakers is that the breakers used to not perform well in gelled oil fracturing fluids, especially in the temperature range of about 20° C. to 65° C. (70° F. to 150° F.). In this temperature range, current breakers work unreliably if at all. Therefore, there exists a need for a more reliable method for breaking a gelled oil fracturing fluid.

SUMMARY OF THE INVENTION

Accordingly, in one aspect, the present invention is a method for breaking a gelled oil fracturing fluid treating a surterranean formation. Specifically, the method for breaking the gelled oil fracturing fluid comprises injecting into the subterranean formation a controlled release breaker capsule comprising an enclosure member enveloping a breaker. The enclosure member is sufficiently permeable to at least one fluid existing in the subterranean environment or in the gelled oil fraturing fluid injected with the controlled release breaker capsule such that the enclosure member is capable of dissolving or eroding off upon sufficient exposure to the fluid, thereby releasing the breaker.

Using the method of the present invention, breaking of gelled oil fracturing fluids is significantly improved when the temperature in the subterranean environment is from about 20° C. to about 65° C.

In another aspect, the present invention is a fracturing fluid comprising a carrier fluid, a viscosifying polymer and a controlled release breaker capsule of an enclosure member enveloping a breaker for the viscosifying polymer wherein the enclosure member is sufficiently permeable to the carrier fluid or at least one fluid existing in the subterranean environment such that, upon sufficient exposure, the enclosure member is capable of rupturing, thereby releasing the breaker.

BRIEF DESCRIPTION OF THE DRAWING

The FIGURE illustrates the immediate viscosity decrease which occurs at 55° C. using non-encapsulated CaO breaker in a gelled oil fracturing fluid, and the improved viscosity profile of an encapsulated calcium oxide breaker according to the present invention.

DETAILED DESCRIPTION OF THE PREFERRED EMBODIMENTS

Figure 1:
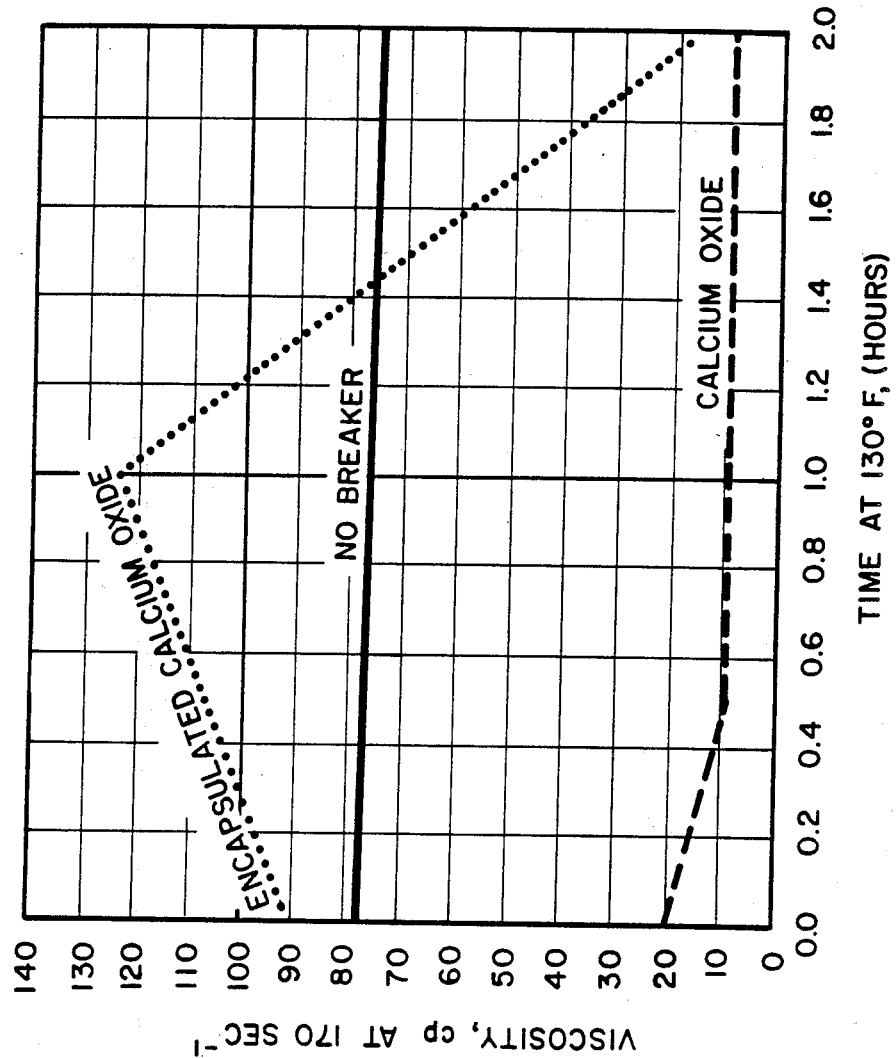

The controlled release breaker capsule employed in the practice of the present invention comprises a hydrocarbon-based enclosure member which envelopes a breaker. The enclosure member is permeable to at least one fluid existing in the subterranean environment or injected with the controlled released capsule such that, upon sufficient exposure to the fluid, the enclosure member is capable of dissolving or eroding off thereby releasing the breaker.

The material most advantageously employed as the enclosure member will vary depending on a variety of factors. Among the various factors are the physical and chemical properties of the material employed as the enclosure member, the operating conditions, including temperature, to which the capsule is to be exposed, the compatibility of the breaker with the enclosure member, and the desired time and mechanism for release. Factors which should be considered, for example, in selecting an enclosure member include the desired time for release after the controlled release capsule is placed in the fracturing fluid, and the amount of stress created by closure of the formation.

The enclosure member is generally a water-insoluble, oil-permeable material. More specifically, the enclosure member of the present invention is a polymer/wax mixture where the polymer may, for example, be at least polyolefin, or at least one polyolefin-vinyl acetate copolymer, or a mixture thereof. The viscosity of the enclosure member may range from 0.05 to 100,000 centipoises with preferred viscosities between about 1 to 5,000 centipoises. Preferred polyolefin-vinyl acetate copolymers include ethylene-vinyl acetate copolymers. A typical liquid coating material which may be used as the enclosure member is 50 weight percent polyethylene of density 0.92, melt index 250, and 50 weight percent paraffin wax having a melting point of 60° C. The coating material to be used as the enclosure member is preferably a liquid at coating temperatures and a solid when cooled, without requiring either a chemical reaction or evaporation of a solvent. The permeability as well as, to a lesser extent, the thickness and elasticity of the enclosure member determines the rate at which the resin/wax coating dissolves or erodes followed by release of the enclosure material.

The breaker particles to be coated with the enclosure member may be of any shape; however, a more uniform coating is obtained with spherical particles. Particle size may generally vary in the range from 10 micrometers to 10 millimeters, although special conditions will permit the use of particles outside this range. Nearly spherical particles may be readily formed by techniques well known in the art, such as spray drying or prilling, by extrusion or compression in molds, or by a agglomeration of fine powders in rotating drums using a liquid phase binder and/or heat.

Suitable breaker materials useful in the practice of the present invention include p-nitrobenzoic acid, triethanolamine, calcium oxide, calcium hydroxide, sodium acetate, and sodium bicarbonate. Of these, calcium oxide and calcium hydroxide are preferred breaker materials. The breaker particles are coated with the enclosure material by forming a suspension of breaker particles and coating material and feeding this suspension onto a rotating surface. This suspension is centrifugally dispersed by the rotating surface into relatively large coated particles and relatively small droplets of coating material. The size of the coated particles depends on the size of the uncoated particles and is much less dependent upon the characteristics of the rotating surface. Upon being thrown from, or falling from, the rotating surface, the coated particles and droplets of coating material are solidified by exposure to air and are separated by sieving, or the like. The solidified droplets of pure coating material may be recycled into the suspension. Coating of all particles is achieved by dispersing the individual breaker particles in the coating material before the suspension reaches the rotating surface. The breaker particles to be coated may constitute up to about 45 percent by volume of the overall suspension slurry, although in general the breaker particles will be in the range between about 20 to about 35 percent by volume. The temperature surrounding the top surface of the disk must be above the melting point of the coating material. Typically this may be between about 120° to 160° C. for polymer/wax mixtures.

The rotational speed of the disk is chosen so that the excess coating material produces much smaller spheres than the coated particles. For breaker particles in the range of 0.5 millimeter diameter and a density of 1.2, a rotational speed of about 1,000 to 1,500 rpm for an eight inch diameter disk provides good spatial separation of the fine resin/wax particles from the much larger coated breaker particles, so that the excess resin/wax particles may be separately collected.

Further details of the method of coating the breaker particles of the present invention with the enclosure material of the present invention may be found in the disclosure of U.S. Pat. No. 4,675,140 by Robert Sparks and Norbert Mason, the entire disclosure of which is incorporated herein by reference. Preferred calcium oxide encapsulated breaker particles are available from the Petrolite Corporation of St. Louis, Mo. 63119 as Exp. product EWS 0749. Preferred calcium hydroxide encapsulated breaker material is also available from the Petrolite Corporation as Exp. product EWS 0768.

EXAMPLE

A gelled hydrocarbon fracturing fluid was prepared from #2 diesel fuel and a aluminum phosphate ester salt. Encapsulated and non-encapsulated calcium oxide were dispersed in separate portions of the fluid. Concentration of encapsulated calcium oxide was 0.50 grams encapsulated particles (50% calcium oxide) per 100 ml of fluid and the non-encapsulated was 0.25 grams per ml. Approximately 85 ml of each of these fluids were added to glass bottles (Pyrex 1395). The samples were kept at 55° C. in a shaker bath (Yamata Constant Temperature BT-25). To insure dispersion of particles the bottles were vigorously shaken by hand for 3 second every 15 minutes. At 30 minute intervals a set of samples were removed from the bath. The rheology (at 170 seconds$^{-1}$ and 55° C.) of the fluids were determined on Fann 35 rheometer using an enclosed sample cup and auxiliary heater. The rheology was calculated using the power law model. The results are illustrated in the FIGURE.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for breaking a gelled oil fracturing fluid which comprises injecting into a subterranean formation controlled release breaker capsules comprising an enclosure member enclosing a breaker for the gelled oil fracturing fluid; the enclosure member, being water-insoluble and oil-permeable, dissolving upon exposure to at least one fluid existing in the subterranean environment or injected with said controlled release breaker capsules such that the enclosure member is capable of releasing the breaker upon sufficient exposure to the fluid.

2. The method of claim 1, wherein the breaker is selected from the group consisting of p-nitrobenzoic acid, triethanolamine, sodium acetate, sodium bicarbonate, calcium oxide and calcium hydroxide.

3. The method of claim 1, wherein the controlled release breaker capsules are injected into the formation as a dispersion in a gelled oil carrier fluid.

4. The method of claim 3, wherein the gelled oil carrier fluid is a gelled oil fracturing fluid.

5. The method of claim 3, wherein the gelled oil carrier fluid contains from about 0.001 to about 2 weight percent of the controlled release breaker capsules based on the weight of the carrier fluid.

6. The method of claim 1, wherein the enclosure member comprises a coating material which is soluble in at least one fluid existing in the subterranean environment or injected with the controlled release breaker capsules.

7. The method of claim 1, wherein the enclosure member is a mixture of a wax and a polymer selected from the group consisting of at least one polyolefin, at least one olefin-vinyl acetate copolymer, and mixtures thereof.

8. The method of claim 1, wherein said controlled release breaker capsules comprise about 50 weight percent of an enclosure member enclosing about 50 weight percent of a breaker.

9. The method of claim 1, wherein said enclosure member comprises about 50 weight percent of paraffin wax and about 50 weight percent of polyethylene.

10. The method of claim 1, wherein said enclosure member comprises about 50 weight percent paraffin wax and about 50 weight percent ethylene-vinyl acetate copolymer.

11. A method for breaking a gelled oil fracturing fluid which comprises injecting into a subterranean formation controlled release breaker capsules comprising an enclosure member of a mixture of wax and a polymer selected from the group consisting of polyolefins and ethylene-vinyl acetate copolymers enclosing a breaker selected from the group consisting of calcium oxide and calcium hydroxide for the gelled oil fracturing fluid; the enclosure member, being water-insoluble and oil-permeable, dissolving upon exposure to at least one fluid existing in the subterranean environment or injected with the controlled release capsules such that the enclosure member is capable of releasing the breaker upon sufficient exposure to the fluid.

12. The method of claim 11, wherein the controlled release breaker capsules are injected into the formation as a dispersion in a gelled oil carrier fluid.

13. The method of claim 12, wherein the gelled oil carrier fluid is a gelled oil fracturing fluid.

14. The method of claim 12, wherein the gelled oil carrier fluid contains from about 0.001 to about 2 weight percent of the controlled release capsules based on the weight of the carrier fluid.

* * * * *